(12) United States Patent
Niot

(10) Patent No.: US 6,546,479 B1
(45) Date of Patent: Apr. 8, 2003

(54) REDUCED INSTRUCTION FETCH LATENCY IN A SYSTEM INCLUDING A PIPELINED PROCESSOR

(75) Inventor: Francois Niot, Biot (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/021,679

(22) Filed: Feb. 10, 1998

(51) Int. Cl.$^7$ .............................................. G06F 12/00
(52) U.S. Cl. ...................................... 712/205; 710/100
(58) Field of Search ................................. 712/205, 206, 712/207, 208, 210, 214, 217, 219, 41, 233, 234, 236, 239, 226; 710/100; 711/169

(56) References Cited

U.S. PATENT DOCUMENTS

| | | | | |
|---|---|---|---|---|
| 3,577,190 A | | 5/1971 | Cocke et al. ............... 712/226 |
| 4,095,278 A | | 6/1978 | Kihara ....................... 712/226 |
| 4,348,721 A | * | 9/1982 | Brereton et al. ............ 712/243 |
| 4,439,828 A | | 3/1984 | Martin ........................ 361/272 |
| 4,639,865 A | | 1/1987 | Martin ........................ 712/226 |
| 4,766,566 A | | 8/1988 | Chuang ...................... 364/900 |
| 5,404,552 A | | 4/1995 | Ikenaga ....................... 712/41 |
| 5,430,862 A | * | 7/1995 | Smith et al. .................. 703/26 |
| 5,459,843 A | | 10/1995 | Davis et al. ................. 395/375 |
| 5,463,760 A | * | 10/1995 | Hamauchi .............. 395/500.49 |
| 5,515,519 A | * | 5/1996 | Yoshioka .................... 712/234 |
| 5,544,307 A | * | 8/1996 | Maemura .................... 712/227 |
| 5,564,028 A | * | 10/1996 | Swoboda et al. ........... 395/375 |
| 5,644,759 A | * | 7/1997 | Lucas et al. ................ 712/240 |
| 5,687,339 A | * | 11/1997 | Hwang ....................... 712/207 |
| 5,774,709 A | * | 6/1998 | Worrell ...................... 712/229 |
| 5,796,973 A | * | 8/1998 | Witt et al. .................. 712/208 |
| 5,815,696 A | * | 9/1998 | Tanaka et al. .............. 712/233 |
| 5,848,289 A | * | 12/1998 | Studor et al. ............... 712/208 |
| 5,935,238 A | * | 8/1999 | Talcott et al. .............. 712/206 |
| 5,978,925 A | * | 11/1999 | Shiraishi et al. ........... 713/400 |
| 6,023,758 A | | 2/2000 | Kodama et al. ............ 712/220 |
| 6,044,450 A | | 3/2000 | Tsushima et al. ............ 712/24 |
| 6,134,653 A | * | 10/2000 | Roy et al. ................... 712/228 |

OTHER PUBLICATIONS

Computer Architecture: A Designer's Text Based On a Generic RISC, James M. Feldman & Charles T. Retter, McGraw–Hill 1994, p. 324–343.
ARM7TDMI Data Sheet, RISC Machines Ltd (ARM) 1995.
ARM System Architecture, Steve Furber, Addison–Wesley 1996, p. 77–87.

* cited by examiner

Primary Examiner—Eric Coleman
(74) Attorney, Agent, or Firm—Peter Zawilski

(57) ABSTRACT

The present invention provides digital computers, memory interfaces, methods of executing a program, methods of programming a digital computer, and methods of operating a memory interface. According to one embodiment, the present invention provides a digital computer including a memory unit configured to store program code including a plurality of ordered program instructions; a processor electrically coupled with the memory unit, the processor being configured to request fetching of program instructions from the memory unit, the processor being further configured to decode and execute the fetched program instructions; and a memory interface electrically coupled with the memory unit and the processor, the memory interface being configured to generate a substitute instruction and fetch program instructions from the memory unit responsive to a request from the processor, the memory interface being further configured to selectively output the fetched program instructions and the substitute instruction to the processor.

16 Claims, 2 Drawing Sheets

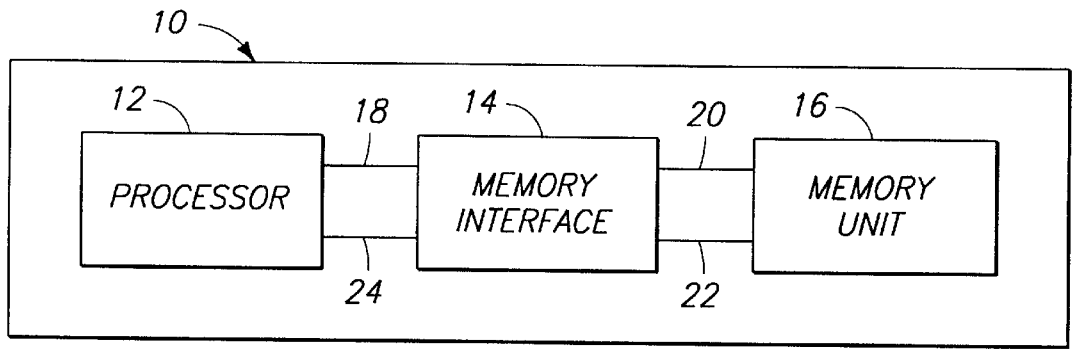
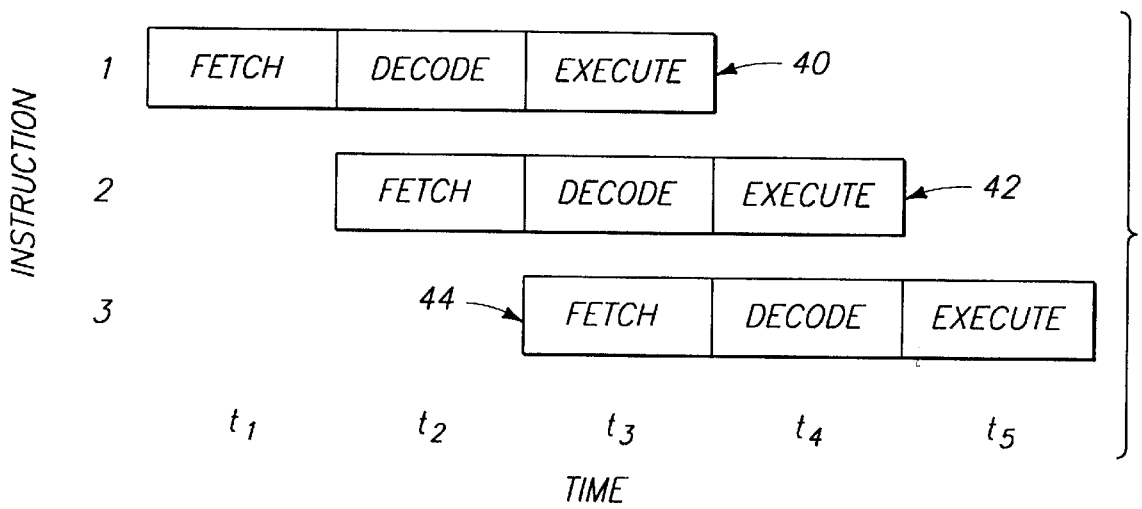

REDUCED INSTRUCTION FETCH LATENCY IN A SYSTEM INCLUDING A PIPELINED PROCESSOR

TECHNICAL FIELD

The present invention relates to digital computers, memory interfaces, methods of executing a program, methods of programming a digital computer, and methods of operating a memory interface.

BACKGROUND OF THE INVENTION

Digital computers are utilized in an ever-increasing number of applications and devices. The advantages obtainable with the use of digital computers are well known. Improvements in hardware and software continue to enhance the performance of digital computers. The desire to provide faster computers at lower costs has often presented numerous design challenges. In numerous applications, available hardware is limited and further design obstacles are presented. In other configurations, minimizing power consumption is of great importance due to limited available power resources.

Typical computer systems include memory operable to store program code tailored for the specific application of the digital computer. Additionally, a processor configured to execute the stored code is also provided. The memory can be configured to store a predetermined number of bits within individual address locations (e.g., memory having a width of eight bits is operable to store eight bits in one address location). The number of bits stored in individual address locations can be less than the number of bits of an individual instruction (e.g., thirty-two bits). Some applications dictate the use of memory having address locations which are smaller than a single executable instruction. Accordingly, plural read operations are required of the memory to provide a single, complete instruction which may be executed by the processor.

Processors of conventional digital computers typically operate at rates which are faster than the associated memory. Therefore, wait states are often inserted during the read operations as the processor waits to receive the requested instructions. Insertion of wait states has the drawbacks of decreasing performance of the digital computer and increasing power consumption.

Therefore, there exists a need to improve execution of software in digital computers to improve performance and reduce power consumption.

BRIEF DESCRIPTION OF THE DRAWINGS

Preferred embodiments of the invention are described below with reference to the following accompanying drawings.

FIG. 1 is a block diagram of one embodiment of a digital computer.

FIG. 2 is an illustrative diagram depicting pipelined operation of a processor.

DETAILED DESCRIPTION OF THE PREFERRED EMBODIMENTS

Figure 3:
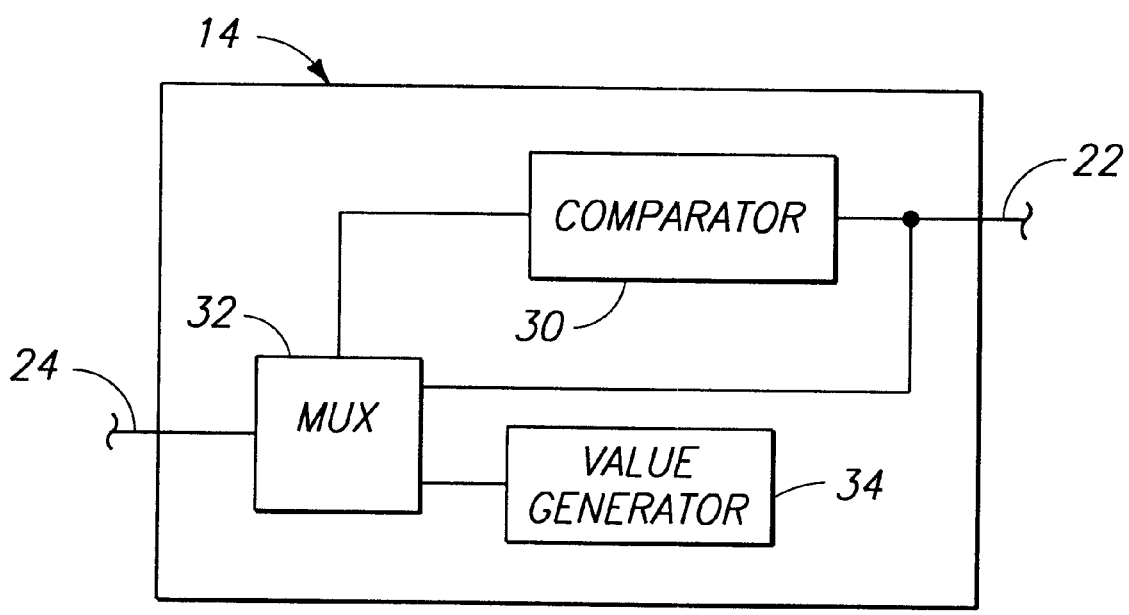
FIG. 3 is a block diagram of one embodiment of a memory interface according to the present invention.

This disclosure of the invention is submitted in furtherance of the constitutional purposes of the U.S. Patent Laws "to promote the progress of science and useful arts" (Article 1, Section 8).

In a first aspect of the present invention, a digital computer comprises: a memory unit configured to store program code including a plurality of ordered program instructions; a processor electrically coupled with the memory unit, the processor being configured to request fetching of instructions from the memory unit, the processor being further configured to decode and execute the fetched instructions; and a memory interface electrically coupled with the memory unit and the processor, the memory interface being configured to generate a substitute instruction and fetch program instructions from the memory unit responsive to a request from the processor, the memory interface being further configured to selectively output the fetched program instructions and the substitute instruction to the processor.

A second aspect of the present invention provides a digital computer comprising: a memory unit configured to store program code including a plurality of instructions; a processor electrically coupled with the memory unit, the processor being configured to request fetching of instructions from the memory unit, the processor being further configured to decode and execute the fetched instructions; and a memory interface electrically coupled with the memory unit and the processor, the memory interface being configured to detect a predefined branch instruction within the program code and output a substitute instruction to the processor responsive to the detection.

According to another aspect of the present invention, a digital computer includes a memory unit configured to store program code having a plurality of instructions, a processor configured to process the program code, and a memory interface electrically coupled with the memory unit and the processor, and the memory interface comprises: a comparator configured to compare a fetched instruction from the memory unit with a predefined instruction; a generator operable to generate a substitute instruction; and a multiplexer electrically coupled with the comparator and the generator, the multiplexer configured to selectively output one of the fetched instruction and the substitute instruction to the processor responsive to the comparison of the comparator.

Another aspect of the present invention provides a digital computer configured to receive plural ordered instructions of a program code including a predefined instruction which causes an unconditional break in the program code and a plurality of instructions subsequent to the predefined instruction, the digital computer being further configured to detect the predefined instruction, disregard at least one instruction subsequent to the predefined instruction and thereafter execute the predefined instruction.

One method of the present invention provides a method of executing a program within a digital computer comprising: storing program code containing a plurality of instructions; fetching a plurality of the instructions; decoding fetched instructions; executing decoded instructions; detecting a predefined instruction; disregarding another instruction responsive to the detecting; and branching within the program code pursuant to the predefined instruction, the branching following the disregarding.

Another aspect of the present invention provides a method of programming a digital computer comprising: storing program code including a plurality of ordered instructions; requesting fetching of the stored instructions; presenting stored instructions to a processor; executing the instructions pursuant to the order; detecting a predefined instruction within the program code; disregarding at least one instruction subsequent to the detected predefined instruction, the disregarding being responsive to the detecting; and following the disregarding, breaking the order of executing the instructions pursuant to the predefined instruction.

According to another aspect, a method of operating a memory interface of a digital computer comprises: receiving an instruction request; fetching an instruction responsive to the receiving; outputting the fetched instruction; detecting fetching of a predefined instruction; and outputting a substitute instruction following the detecting.

Yet another aspect of the present invention provides a method of executing a program within a pipelined processor of a digital computer comprising: fetching an instruction during a first time period including plural clock cycles of the digital computer; decoding the fetched instruction; detecting a predefined instruction; generating a substitute instruction; and outputting the substitute instruction, the generating and outputting being responsive to the detecting and during a second time period being less than the first time period.

The present invention is described with reference to a digital computer configured as a reduced instruction set computer (RISC). Exemplary reduced instruction set computers are generally described in U.S. Pat. Nos. 4,766,566 and 5,459,843, and James M. Feldman, Charles T. Retter, *Computer Architecture*: *A Designer's Text Based On a Generic* RISC (MacGraw-Hill 1994), all incorporated herein by reference. The described embodiment of the digital computer is illustrative and the present invention is not limited to such an embodiment.

Referring to FIG. 1, a digital computer 10 is shown. The illustrated digital computer 10 includes a processor 12, memory interface 14 and memory unit 16. Memory interface 14 is electrically coupled intermediate processor 12 and memory unit 16. The invention is described with reference to components 12, 14, 16. Digital computer 10 may include additional components such as an I/O interface, display, etc.

In the described embodiment, processor 12 comprises a RISC processor having a pipelined architecture. The described processor 12 comprises a ARM7TDMI processor available from VLSI Technology Inc. of San Jose, Calif. The ARM7TDMI processor is capable of running in an ARM mode wherein individual instructions are thirty-two bits in length. As described below, typical ARM processors employ a three-stage pipeline including a fetch stage, decode stage and execute stage. ARM operation is described in detail in Steve Furber, *Arm System Architecture* (VLSI Technology/ADDISON-WESLEY 1996), incorporated herein by reference.

An address bus 18 and data bus 24 couple processor 12 and memory interface 14. Further, an address bus 20 and data bus 22 couple memory interface 14 and memory unit 16. In the described embodiment, data bus 22 comprises an eight bit bus adapted to transmit eight bits. If thirty-two bit instructions are provided, data bus 22 is configured to transmit a portion of an instruction. The illustrated data bus 24 comprises a thirty-two bit bus adapted to transmit complete instructions.

Memory unit 16, also referred to as program memory, is configured to receive and store software or program code including a plurality of ordered program instructions. Memory unit 16 may comprise either volatile or nonvolatile memory. Memory unit 16 has plural addressable memory locations of a predetermined width which are individually configured to store plural bits. In the described embodiment, individual memory locations of the described memory unit 16 are eight bits wide.

Processor 12 forwards instruction requests via address bus 18 and some control signals to memory interface 14.

Memory interface 14 is configured to implement memory interface unit and/or bus interface unit operations in the illustrated embodiment. Responsive to receiving instruction requests, memory interface 14 is configured to read or fetch instructions from memory unit 16. Memory interface 14 provides the fetch request to memory unit 16 via address bus 20.

Memory interface 14 receives stored data from memory unit 14 via data bus 22. Depending upon the length of the instructions and the capacity of individual storage locations of memory unit 16, plural reads of memory unit 16 may be required to provide a complete, executable instruction. In the described embodiment, storage locations of memory unit 16 are eight bits wide while the instructions are individually thirty-two bits in length. Accordingly, four separate reads of memory unit 16 are required for one complete instruction in the described embodiment. Following the fetching operations, memory interface 14 presents complete instructions to processor 12 via data bus 24 for execution.

Referring to Table 1 below, an exemplary portion of program code is shown. In particular, eight instructions are shown represented by respective corresponding lines 1–8.

TABLE 1

| Line | | Instruction | | | |
|------|-----|-----|-----|-----|-----|
| 1 |   | MOV | R0, | #0 | |
| 2 |   | MOV | R1, | #0 | |
| 3 |   | B   | L0  |    | ; branch to label L0 |
| 4 |   | MOV | R2, | #0 | |
| 5 |   | MOV | R3, | #0 | |
| 6 |   | MOV | R4, | #0 | |
| 7 | L0 | MOV | R5, | #0 | |
| 8 |   | MOV | R6, | #0 | |

In a pipelined configuration as described herein, processor 12 is configured to execute the ordered instructions of the program code in a plurality of steps. Initially, a fetch cycle occurs where an instruction is requested by processor 12 and read from memory unit 16 by memory interface 14. Second, the instruction is decoded in a decode cycle by processor 12. Finally, processor 12 executes the decoded instruction in an execute cycle.

More specifically, during the fetch stage, an instruction is fetched from memory 16 and placed in an instruction pipeline. During the decode stage, the fetched instruction is decoded and datapath control signal are prepared for the next cycle. The decoded instruction may be said to "own" decode logic of processor 12 but not the datapath during the decode stage. During the execution stage, the instruction may be said to "own" the datapath of processor 12. During a typical execution state, an ALU (arithmetic logic unit) result is generated and written into a destination register.

Utilization of pipelined architecture permits processor 12 to simultaneously preform numerous steps during execution of the program code. For example, processor 12 can execute an initial instruction (n) while simultaneously decoding a subsequent ordered instruction (n+1) and fetching the next ordered instruction (n+2).

Pipelined processors may be configured for operation upon single-cycle instructions and multi-cycle instructions. When the pipelined processor is executing instructions which are completed in a single cycle, the pipeline enables one instruction to be completed every clock cycle. Single-cycle instructions require three clock cycles for completion resulting in a three cycle latency. However, the throughput is one instruction per cycle. Instructions which take longer are completed within multiple cycles.

Referring to FIG. 2, one example of code execution by a pipelined processor is illustrated. The illustrated code includes three instructions (shown aligned in horizontal rows in FIG. 2). Operation of a pipelined processor upon instructions one, two, and three is described with reference to respective lines 40, 42, 44. Time increases left to right from $t_1$ to $t_5$ in FIG. 2. At time $t_1$, instruction one corresponding to line 40 is fetched. At time $t_2$, instruction one is decoded and instruction two corresponding to line 42 is fetched. At time $t_3$, instruction one is executed, instruction two is decoded and instruction three corresponding to line 44 is fetched. At time $t_4$, instruction two is executed and instruction three is decoded. At time $t_5$, instruction three is executed.

Referring to Table 2, execution of the exemplary program code of Table 1 within a pipelined processor is illustrated. Execution of the code is illustrated sequentially from column 1 to column 9 of Table 2 (i.e., time increase from left to right). Fetch operations of instructions are represented by "F", instruction decode operations are represented by "D" and instruction execution operations are represented by "E" in Table 2.

TABLE 2

| | | | Columns | | | | | | | |
|---|---|---|---|---|---|---|---|---|---|---|
| | | | 1 | 2 | 3 | 4 | 5 | 6 | 7 | 8 | 9 |
| Line 1 | MOV | R0 | F | D | E | | | | | | |
| Line 2 | MOV | R1 | | F | D | E | | | | | |
| Line 3 | B | L0 | | | F | D | E | | | | |
| Line 4 | MOV | R2 | | | | F | D | — | | | |
| Line 5 | MOV | R3 | | | | | F | — | — | | |
| Line 7 | MOV | R5 | | | | | | F | D | E | |
| Line 8 | MOV | R6 | | | | | | | F | D | E |

As shown, the first instruction corresponding to line 1 is fetched in column 1. During column 2, the first instruction is decoded and the second instruction corresponding to line 2 is simultaneously fetched.

Proceeding to column 3, the pipelined processor executes the first instruction, decodes the second instruction and fetches the third instruction corresponding to line 3. This procedure is repeated as the program code is executed.

Referring to the program code of Table 1, the instruction of line 3 comprises an "unconditional branch to label L0" instruction. After the unconditional branch instruction is executed in column 5, processor 12 branches to the instruction MOV R5 corresponding to line 7. The instruction of line 7 is thereafter fetched at column 6. The instruction of line 8 is fetched and the instruction of line 7 is decoded at column 7. At column 8, the instruction of line 7 is executed and the instruction of line 8 is decoded. Thereafter, the instruction of line 8 is executed at column 9.

As previously mentioned, memory unit 16 of the described embodiment has a width less than the length of an individual instruction used by processor 12. In particular, memory unit 16 has a width of eight bits while processor 12 is configured to execute thirty-two bit instructions. As such, memory interface 14 performs four sequential eight-bit reads from four consecutive memory locations of memory unit 16 responsive to a request from processor 12 to fetch a new instruction. Memory interface 14 arranges the resulting thirty-two bit instruction and presents the arranged instruction to processor 12 via data bus 24.

Processor 12 operates at a faster rate than memory unit 16 in the described embodiment. Therefore, processor 12 waits during the time period memory interface 14 performs four eight-bit reads of memory unit 16 to fetch the thirty-two bit instruction. Accordingly, wait states are inserted during the fetch operations.

In an exemplary digital computer system where processor 12 is operating at 25 MHz and the program memory 16 has an access time of 100 ns, a time period of twelve clock cycles is required to read a single thirty-two bit instruction in four eight-bit read operations. Processor 12 is required to wait during eleven of the twelve clock cycles. Once the thirty-two bit instruction is fetched and presented, only one clock cycle is required to decode the fetched instruction and another clock cycle is necessary to execute the fetched instruction.

Referring again to Table 1, the instruction at line 3 of the exemplary program code is an unconditional branch instruction specifying a branch to label L0 (corresponding to instruction MOV R5). Referring to Table 2, following the fetching of the unconditional branch instruction in column 3 of Table 2, two subsequently ordered instructions (i.e., instructions of line 4 and line 5) are fetched in column 4 and column 5, respectively. These instructions corresponding to line 4 and 5 are fetched but never executed inasmuch as processor 12 branches to the instruction of line 7 (i.e., MOV R5) in Table 2 as specified by the unconditional branch instruction of line 3.

Fetching of the two instructions corresponding to line 4 and line 5 subsequent to the fetching of the unconditional branch instruction results in unnecessary delay during the execution of the program code. In particular, the instructions of line 4 and line 5 are not executed as a result of the unconditional branch operation.

For example, if twelve clock cycles are required to read individual thirty-two bit instructions from memory unit 16 and only one clock cycle is required to decode the instruction within processor 12 and one clock cycle is required to execute the instruction within processor 12, then twenty-two clock cycles are lost using a conventional design compared with the digital computer 10 of the present invention. A conventional computer requires thirty-six clock cycles to fetch, decode and execute an instruction (i.e., twelve clock cycles for individual fetch, decode, execute operations of the instruction). Digital computer 10 of the present invention utilizes fourteen clock cycles to fetch, decode and execute an instruction (i.e., twelve clock cycles to fetch the instruction, one clock cycle to decode the instruction, and one clock cycle to execute the instruction).

In accordance with the present invention, instructions subsequent to a predefined or preselected instruction of program code are skipped or disregarded. In the illustrated piece of code of Table 1, the predefined instruction is an unconditional branch instruction. Exemplary predefined instructions are specified as instructions which cause an unconditional break in the instruction flow of the ordered program code. For example, the predefined instruction can include a call to subroutine instruction (e.g., Call instruction, Branch and Link instruction), or a return from a subroutine instruction (e.g., RET instruction) in other embodiments.

In one embodiment of the invention, digital computer 10 is configured to detect the predefined instructions in the program code and subsequently skip or disregard the following two fetched instructions. In particular, memory interface 14 is configured to return two dummy values or instructions (also referred to as substitute instructions) to processor 12 following the detection of the predefined instruction. Returning dummy instructions does not affect execution of the program code since the instructions (either actual code or dummy instructions) are not executed. In essence, digital computer 10 replaces at least one program instruction of the stored code with a dummy instruction in the preferred embodiment.

Referring to FIG. 3, one embodiment of hardware for improving the performance of digital computer 10 in accordance with the present invention is illustrated. In particular, data flow within memory interface 14 from data bus 22 to data bus 24 is illustrated. The depicted memory interface 14 includes a comparator 30, multiplexer 32 and value generator 34. Comparator 30 is electrically coupled with data bus 22 and multiplexer 32. Following the fetching of an instruction from program memory 16, the instruction is received via data bus 22 within comparator 30 and multiplexer 32.

In the illustrated embodiment, comparator 30 is configured to compare the operation code (op-code) of the fetched instruction with the operation code of the predefined instructions (e.g., unconditional branch instruction). Responsive to identifying an operation code of one of the predefined instructions, comparator 30 applies a control signal to multiplexer 32.

Multiplexer 32 is configured to receive values from value generator 34 in the illustrated embodiment. Value generator 34 is operable to generate dummy instructions for selective application to processor 12. In exemplary embodiments, value generator 34 comprises either a connection to $V_{ss}$ for providing logic low dummy instructions or $V_{dd}$ for providing logic high dummy instructions.

Responsive to the control signal of comparator 30, multiplexer 32 selectively outputs either the fetched instruction received from memory unit 16 or a dummy instruction from value generator 34. Multiplexer 32 outputs the instruction or dummy instructions via data bus 24 to processor 12. In the described embodiment, comparator 30 controls multiplexer 32 to apply the fetched instruction to processor 12 when the operation code of the fetched instruction does not match the operation code of one of the predefined instructions. Alternatively, comparator 30 controls multiplexer 32 to apply the dummy instruction to processor 12 when the operation code of the fetched instruction matches the operation code of one of the predefined instructions.

The embodiment of FIG. 3 is illustrative only and other hardware configurations may be utilized to apply dummy instructions to processor 12. For example, plural AND gates are utilized to apply logic low dummy instructions to processor 12 in other embodiments.

Memory interface 14 is preferably configured to indicate to processor 12 that an instruction is ready via data bus 24. Therefore, the dummy instruction is immediately available following detection of one of the predefined instructions minimizing waiting of processor 12.

The described memory interface 14 is configured to set a flag to processor 12 when an instruction is ready to be read via data bus 24. In particular, memory interface 14 is configured to immediately set the flag indicating an instruction is ready following detection of one of the predefined instructions. In one embodiment, comparator 30 is configured to set the flag indicating that the instruction is ready on data bus 24.

In an alternative embodiment, data is applied directly to data bus. 24 and processor 12 from memory unit 16 immediately following detection of one of the predefined instructions. More specifically, memory interface 14 immediately indicates that the next instruction is ready via the flag following detection of one of the predefined instructions. Data from memory unit 16 is immediately provided to data bus 24 avoiding the need of processor 12 to enter one or more wait states. In one embodiment, memory interface 14 is configured to detect a predefined program instruction on one system clock cycle and output the substitute instruction to processor 12 during the next system clock cycle.

It is of no concern that the data (i.e., subsequent two instructions) from memory unit 16 is unstable inasmuch as the data is skipped or disregarded. In sum, wait states of processor 12 are avoided as a result of immediate indication and application of dummy instructions from memory interface 14 to processor 12.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. In a computer system including a processor having a first data bus width coupled to a memory having a second data bus width by a memory interface unit bridging the dissimilar first and second data bus widths, a method of fetching instructions comprising:
   a) initiating a first instruction fetch that requires N bytes, where N is an integer, and where the instruction includes an operation code;
   b) performing N memory transactions on the second bus to transfer N bytes from the memory to the memory interface unit, and assembling a complete instruction;
   c) presenting the N bytes of the instruction to the processor over the first bus in one transfer;
   d) determining, in the memory interface unit, whether the operation code of the instruction corresponds to a pre-defined instruction; and
   e) presenting, if the determination in (d) is affirmative, a first predetermined instruction to the processor over the first bus, in response to a second instruction fetch initiated sequentially to the first instruction fetch.

2. The method of claim 1, wherein the processor is pipelined and overlaps instruction fetch, instruction decode, and instruction execute operations.

3. The method of claim 2, further comprising causing the processor to wait while the N memory transactions are performed.

4. The method of claim 3, wherein initiating the first and second instruction fetches comprises communicating between the processor and the memory interface unit.

5. The method of claim 4, wherein determining whether the operation code of the instruction corresponds to a pre-defined instruction comprises comparing the operation code to at least one predetermined value where that value represents an instruction corresponding to an unconditional change in control flow.

6. The method of claim 5, wherein the instruction corresponding to an unconditional change in control flow comprises an unconditional branch instruction.

7. The method of claim 3, wherein N equals 4.

8. The method of claim 5, wherein presenting a first predetermined instruction comprises presenting an instruction code corresponding to a NOP operation.

9. The method of claim 5, wherein presenting a first predetermined instruction comprises presenting all ones.

10. The method of claim 5, wherein presenting a first predetermined instruction comprises presenting all zeroes.

11. The method of claim 5, wherein presenting a first predetermined instruction comprises operating a value generator to produce a substitute instruction.

12. A method of fetching instructions having a width of N bits, for a pipelined processor that overlaps instruction fetch, decode, and execute operations, from a memory having a width of M bits, comprising:

communicating signals initiating an instruction fetch cycle from a processor to a memory interface unit;

the memory interface unit performing N/M transactions with the memory to assemble the N bits of the instruction;

the memory interface unit providing a wait signal to the processor for at least a portion of the N/M transactions;

determining whether an operation code of the instruction represents an instruction which, when executed, will result in an unconditional change in control flow; and presenting in response to a next sequential instruction fetch cycle, if the determination is affirmative, at least one substitute instruction to the processor without accessing memory and without generating a wait signal.

13. The method of claim 12, wherein N equals 32, and M equals 8.

14. The method of claim 13, wherein the processor is a RISC processor.

15. A system for fetching instructions, comprising:

a pipelined processor that overlaps instruction fetch, decode, and execute operations;

a memory having an output width that is less than the width of an instruction;

a memory interface unit coupled to the processor by at least a data bus having a first width, the memory interface unit further coupled to the memory by at least a data bus having a second width, the first width being greater than the second width, the memory interface unit adapted to retrieve, in response to an instruction fetch request from the processor, an instruction from the memory by performing multiple memory transactions, the memory interface unit further adapted to provide a wait signal to the processor during at least a portion of the multiple memory transactions;

a comparator, disposed within the memory interface unit, for generating an indication that an operation code of an instruction retrieved from the memory corresponds to an instruction which, when executed, unconditionally causes a change in the address from which instructions are fetched; and a value generator, disposed within the memory interface unit, for generating a substitute instruction and presenting that substitute instruction to the processor in response to a next sequential instruction fetch request without generating a wait signal.

16. The system of claim 15, wherein the processor is a RISC processor, the instruction width is 32 bits, and the memory output width is eight bits.

* * * * *